Patented Sept. 25, 1945

2,385,615

UNITED STATES PATENT OFFICE 2,385,615

FLUORESCENT SULPHIDE PIGMENT COMPOSITION

John F. Dreyer, Cincinnati, Ohio, assignor to The Formica Insulation Company, a corporation of Ohio No Drawing. Application July 1, 1942, Serial No. 449,327

2 Claims. (Cl. 252—301.6)

This invention relates to a method of treating fluorescent compounds to protect them from destruction when exposed to ultra-violet light in the presence of moisture.

Fluorescent materials are highly desirable in name plates, panels, and instrument boards of airplanes, automobiles, and the like, where it is important that parts of the panel be seen clearly and yet no glare must be thrown back into the eyes of the operator or be readily visible from a considerable distance.

It has been found that fluorescent compounds of the zinc sulphide, cadmium sulphide, etc., types have a tendency to darken when exposed to ultra-violet light in the presence of moisture. A yellow fluorescent material having certain optical characteristics has been used but it has been found to have very poor light-fastness in the presence of moisture. Manufacturers who have attempted to use this pigment have been obliged to withdraw the product because of this difficulty and the less desirable phosphorescent pigments substituted. Difficulty is found particularly in products where the fluorescent material is painted on, but even in laminated products, there is difficulty at the edges if moisture has an opportunity to attack the pigment.

I have discovered that fluorescent compounds of the zinc sulphide, cadmium sulphide, etc., types can be protected against this destructive action by combining them with a cation active wetting agent. The pigment may be treated with a water solution of the agent and the results are obtained readily, apparently by chemical reaction or simply by an adsorption. The sulphides are apparently basic and attract the polar group of the cation active material with a greater affinity than they attract water. The sulphide is thus protected from the action of water.

There are many cation active wetting agents available on the market that are satisfactory, for example: di-ethyl hexylamine, octylamine, cyclohexylamine, and dicyclohexylamine.

Most of the amines are cation active and these materials vary in their degree of cation activity. Octadecylamine is an excellent one. Secondary amines are better than primary amines and tertiary amines are even better. However, quarternary amines are not as effective as the tertiary. In addition to the amines there are also some pyridinium compounds which are effective. Amides, phosphonium and sulphonium compounds are the groups that I have tested and found satisfactory.

The combination of the sulphides and the cation active material takes place most readily in the presence of water where ionization can occur. The combination is made by using an excess of the cation active material and removing it by washing with water.

For example, the pigment may be treated with a water solution of mono-hexa and octodecylamine hydrochloride. After mixing for about ten minutes, the water is drained off, and the pigment washed, filtered and dried.

When the pigments are incorporated in a resin solution, they are mixed or ground into the vehicle; for example, toluol solution of polystyrene when forming a paint. In the case of laminating varnish it is stirred into urea formaldehyde resin and processed in the manner described in my Patent No. 2,275,290 issued March 3, 1942.

The wetting characteristic of the cation-treated fluorescent pigment is much superior to that of the untreated pigment. It can be more readily put into suspension in a varnish and the suspension is retained longer.

The foregoing detailed description has been given for clearness of understanding only, and no unnecessary limitations should be understood therefrom for some modifications will be obvious to those skilled in the art.

I claim:

1. A fluorescent sulphide pigment in finely divided form, the particles having a non-volatile surface coating of a cation active wetting agent having the property of substantially completely inhibiting the effect of moisture upon said particles, said agent comprising a non-volatile amine.

2. A fluorescent composition comprising an insoluble water-susceptible fluorescent sulphide pigment, and a body of urea formaldehyde resin material in which said pigment is embedded, said body being set by heat and pressure, and the particles of said pigment having a surface coating of a moisture inhibiting cation active wetting agent comprising a non-volatile amine.

JOHN F. DREYER.